Dec. 8, 1936.   R. E. SMITH   2,063,408
SPLIT DRIVE-SINGLE CONTROL
Filed July 27, 1934   2 Sheets-Sheet 1
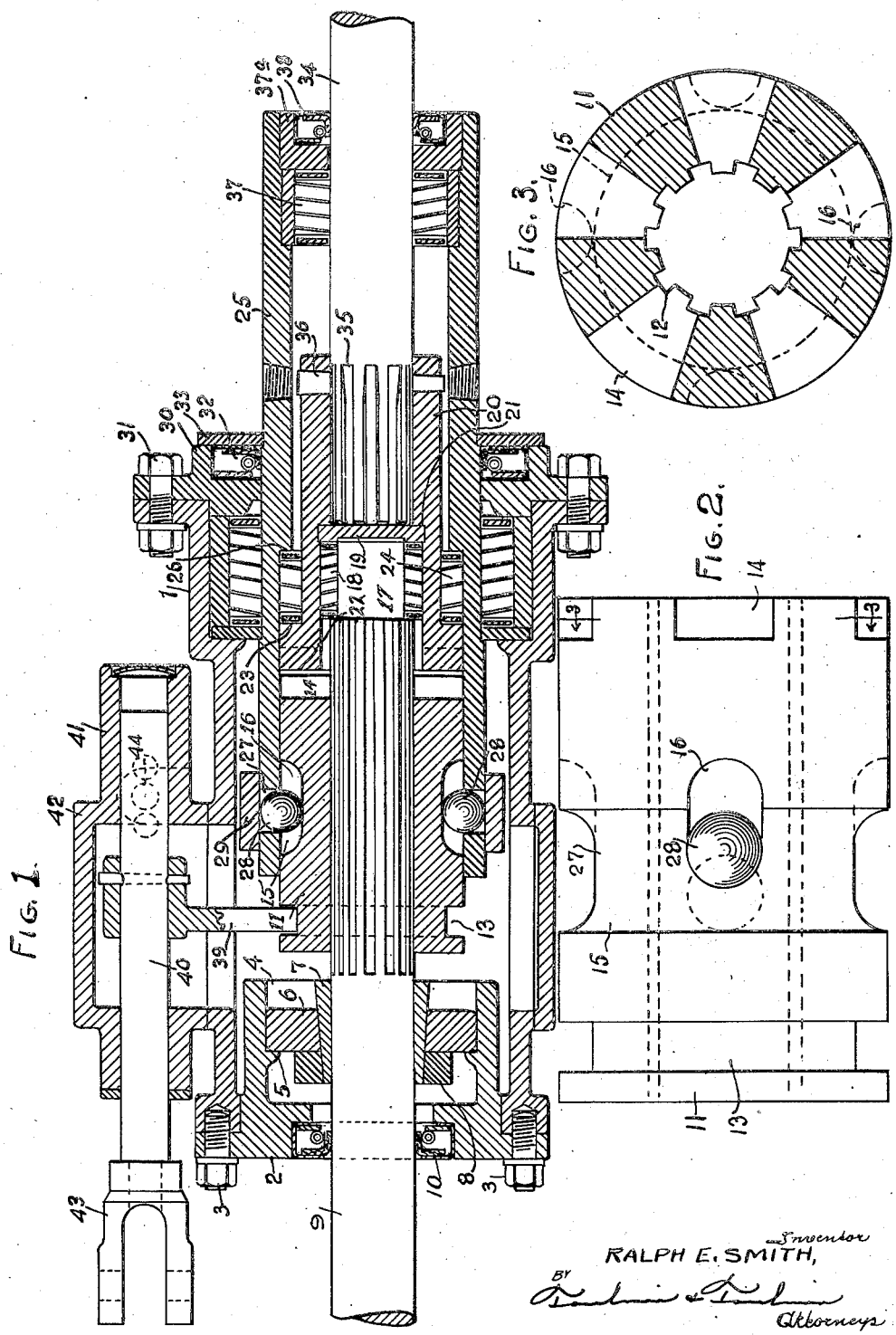
RALPH E. SMITH, Inventor Dec. 8, 1936.    R. E. SMITH    2,063,408
SPLIT DRIVE-SINGLE CONTROL
Filed July 27, 1934    2 Sheets-Sheet 2

Inventor
RALPH E. SMITH,
By
Attorneys

Patented Dec. 8, 1936

2,063,408

UNITED STATES PATENT OFFICE 2,063,408

SPLIT DRIVE-SINGLE CONTROL

Ralph Ervin Smith, Galion, Ohio, assignor to The Galion Metallic Vault Company, Galion, Ohio, a corporation of Ohio Application July 27, 1934, Serial No. 737,278

9 Claims. (Cl. 74—11)

This invention relates to improvements in power take-off in the nature of a split drive having a single control.

It is the object of this invention to provide, in connection with a source of power, means for connecting this source of power to a plurality of driven elements operated by a single control member.

It is an object to provide, in connection with a power shaft, means movable on the shaft for connecting the power to a plurality of driven elements, said means being operated by a single instrumentality.

These and other advantages will appear from the following description taken in connection with the drawings.

Referring to the drawings:

Figure 1 is a longitudinal section through a split power take-off, showing the clutch mechanism in neutral position.

Figure 2 shows in elevation the clutch member.

Figure 3 is a section on the line 3—3 of Figure 2.

Figure 4:
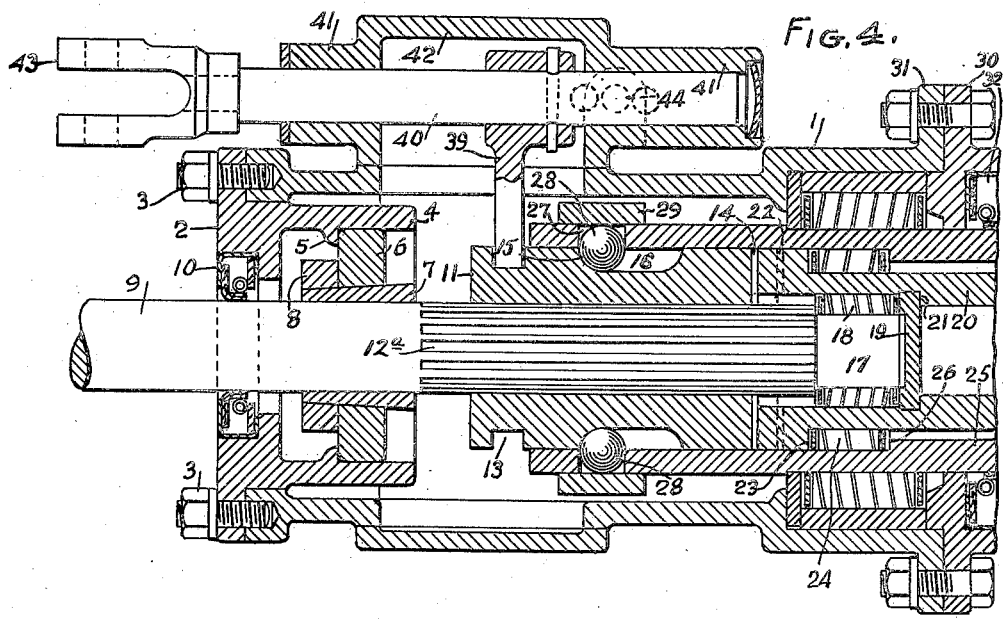
Figure 4 is a view similar to Figure 1, with the clutch in position to connect the power shaft to a driven shaft operated for traction purposes.

The present apparatus may be used in connection with various power shafts, but is particularly well adapted for use in connection with automotive vehicles for driving machinery supported thereby. The power take-off mechanism is supported in a frame or housing 1, suitably attached to the under side of the automotive vehicle frame. This frame or housing is elongated and open at each end. One end, which is the forward end, is closed by means of an end plate 2, attached thereto by means of screws 3. Extending inwardly and rearwardly from this plate is a cylindrical projection 4, which has on the interior thereof a shoulder 5 against which a ring member 6 abuts.

Within this ring member is a conical shaped sleeve bearing 7 engaged on its smaller end by means of a ring 8, which closely fits against the ring member 6 for holding these elements assembled to form a complete bearing for a longitudinally disposed power shaft 9 which extends through the sleeve bearing 7. Where the power shaft passes through the end plate 2 there is a sealing means 10. Longitudinally movable on the shaft 9 is a clutch member 11 held against rotation thereon by means of the grooves 12 thereof, which engage corresponding splines 12a on the shaft 9. On the periphery of the clutch member 11 is a peripheral groove 15, which has extending rearwardly therefrom a plurality of slots 16. The rearward end of the clutch member is provided with a plurality of clutch elements or jaws 14 adapted to engage similar jaws 22 on a coacting member. Adjacent the other end of the clutch member from the clutch jaws, and around the periphery of the clutch member, is a groove 13 adapted to receive a clutch shifting yoke.

The rear end of the drive or power shaft 9 is reduced at 17 and is supported in the reduced part by means of roller bearings 18 held in place by a shoulder formed by the reduced part and by a disc 19 abutting the reduced end of the power shaft. Fitting over the reduced end of the power shaft, the bearings and the disc 19 is a sleeve 20 which forms a part of the driven shaft. This sleeve has an inner shoulder 21 which abuts the disc 19 for holding it in position adjacent the end of the driving shaft. On the forward end of the sleeve 20 is a plurality of clutch elements or jaws 22 adapted to be engaged by the clutch elements or jaws 14 for rotation.

The forward end of the sleeve is provided with an outer shoulder 23 against which abuts a roller bearing 24. Surrounding the clutch member and the sleeve is a hollow driven shaft 25, which has an inner shoulder 26 thereon cooperating with the shoulder 23 for holding the roller bearings 24 in position. The forward end of the hollow shaft is provided with a plurality of holes 27, each of which has therein a ball 28. There are as many of these holes as there are slots 16. For the purpose of properly positioning and holding the balls in position there is a ring 29 around the forward end of the hollow shaft over the holes.

The rear end of the frame or housing is closed by means of an end plate 30, attached to the frame by means of bolts or screws 31. This frame is provided with sealing means 32 around the hollow shaft 25, which is held in position by a plate 33. Extending into the rear end of the hollow driven shaft 25 is a driven shaft 34 used for traction purposes. This shaft is splined at 35 to the rear end of the sleeve 20 for rotation by the sleeve, and is also provided with a pin 36 which prevents any movement of the shaft with relation to the sleeve. Around this shaft and between it and the hollow shaft 25 are roller bearings 37, suitably supported in the end of the hollow shaft by a disc 37a, which has therein sealing means 38.

The clutch member is moved longitudinally of the power shaft 9 by means of a yoke 39, which fits in the groove 13. This yoke is supported and operated by a control rod 40, supported in bearings 41 forming part of a casing 42 suitably attached to the frame. On the forward end of the control rod is a clevis 43 by which this rod may be connected to a lever for operating purposes. This lever is usually located adjacent the seat of the operator of the automotive vehicle. For the purpose of holding the control rod in a desired position the balls and sockets 44 are provided.

In Figure 1 the clutch member is shown in neutral position. The balls 28 are out of engagement with the slots 16 and are adapted to travel around the clutch member in the peripheral groove 15. At this time the clutch jaws or elements are out of engagement.

In Figure 4 the clutch member is shown in its most rearward position with the clutch jaws engaging one another so that the sleeve 20, and through it the shaft 34, rotate. At this time the balls 28 will rotate in the groove 15.

Figure 5:
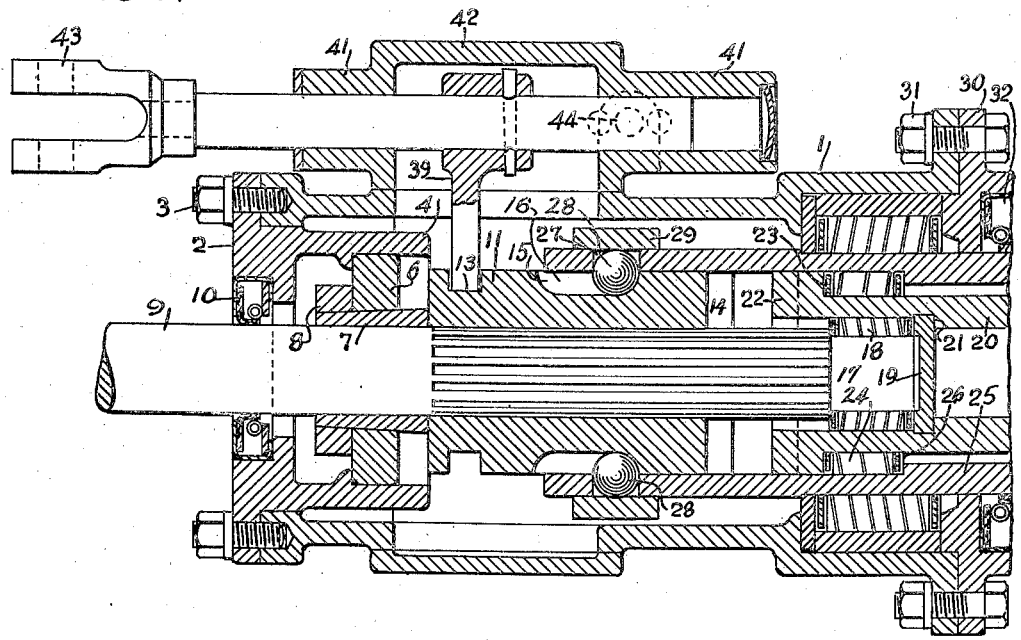
Figure 5 is a view similar to Figure 4 but with the clutch mechanism in position to connect the power shaft to a cylindrical shaft for driving sprockets, gears and the like and disconnected from the driven shaft operated for traction purposes.

In Figure 5 the clutch member is in its most forward position with the balls resting in the slots 16 so that a rotation of the shaft 9 will cause the hollow shaft 25 to rotate and carry with it any sprocket wheel or pulleys that may be located thereon. All of these changes in connections are brought about by the operation of a single instrumentality located in a convenient position for operation.

It will be understood that I desire to comprehend within my invention such modifications as come within the scope of my claims and my invention.

Having thus fully described my invention, what I claim as new and desire to secure by Letters Patent, is:

1. In a power take-off, a frame, a hollow driven shaft rotatably supported by the frame, a second driven shaft rotatably supported in the hollow shaft, a sleeve on the second driven shaft, a power shaft supported by roller bearings in the frame and by roller bearings in the sleeve, clutch jaws on the sleeve, balls mounted in recesses in the hollow shaft projecting beyond the inner surface thereof and arranged to serve as power-transmitting members, and a clutch member having jaws adapted to engage the sleeve jaws, an annular groove in the clutch member in which the balls may run free when the jaws of the clutch and sleeve members are in engagement, and pockets in said clutch member adjacent the groove to receive the balls to clutch the hollow shaft to the power shaft when the jaws are out of engagement, said groove being of such width that in one position of the clutch, when said jaws are disengaged, the balls may rotate freely therein, and the clutch member may rotate with the power shaft free of both driven shafts.

2. In a power take-off, a frame, a hollow driven shaft rotatably supported by the frame, a second driven shaft rotatably supported in the hollow shaft, a power shaft, clutch jaws associated with the end of said second driven shaft, balls mounted in recesses in the hollow shaft projecting beyond the inner surface thereof and arranged to serve as power-transmitting members, and a slidable clutch member rotating with said power shaft and having jaws adapted to selectively engage the jaws associated with said second driven shaft, said clutch member having a groove in which the balls may freely run when said jaws are in engagement and the power shaft rotates free of said hollow driven shaft and pockets to receive the balls to clutch the hollow shaft to the power shaft when the jaws are out of engagement.

3. In a power take-off, a frame, a hollow driven shaft rotatably supported by the frame, a second driven shaft rotatably supported in the hollow shaft, a power shaft, clutch jaws associated with the end of said second driven shaft, balls mounted in recesses in the hollow shaft projecting beyond the inner surface thereof and arranged to serve as power-transmitting members, a slidable clutch member splined on the power shaft and having jaws adapted to selectively engage the jaws associated with said second driven shaft, said clutch member having a groove in which the balls may freely run when said jaws are in engagement and pockets leading from said groove in said clutch member to receive the balls to clutch the hollow shaft to the power shaft when the jaws are out of engagement, said groove being of such width as to also provide for free movement of the balls therein when said jaws are disengaged in one position of the clutch member, whereby the power shaft may be connected and/or disconnected with either driven shaft and simultaneously disconnected from both.

4. In a power take-off comprising a power shaft and a plurality of driven shafts disposed axially therewith and rotatable one within the other, the outer driven shaft having balls disposed in radially-spaced slots therein, said power shaft being selectively engageable with each of said driven shafts by means of a clutch member; said clutch member comprising a substantially cylindrical member slidable on and rotatable with the power shaft and having on the periphery thereof an annular groove with spaced radially disposed pockets leading therefrom and cooperating with said balls to connect or disconnect the power shaft with said outer driven shaft whereby, when the balls are disposed in said pockets, the power shaft and said outer driven shaft are connected and whereby, when the balls run free in said annular groove, said power shaft and said outer driven shaft are disconnected from each other.

5. In a power take-off comprising a plurality of driven shafts disposed axially therewith and rotatable one within the other, the outer driven shaft having balls disposed in radially-spaced slots therein and the others thereof having axially-extending jaws thereon, said power shaft being selectively engageable with each of said driven shafts by means of a clutch member; said clutch member comprising a substantially cylindrical member slidable and rotatable with the power shaft and having on the periphery thereof an annular groove with spaced radially-disposed pockets leading therefrom and cooperating with said balls to connect and disconnect the power shaft with said outer driven shaft and having at the end thereof axially-extending jaws for cooperation with the jaws on the inner driven shafts whereby, when the balls are disposed in said pockets, the power shaft and said outer driven shaft are connected and whereby, when the balls run free in said annular groove, said power shaft and said outer driven shaft are disconnected and the power shaft may be connected with the inner driven shafts by engagement of the jaws thereof with the jaws of the clutch member.

6. In a power take-off comprising a plurality of driven shafts disposed axially therewith and rotatable one within the other, the outer driven shaft having balls disposed in radially-spaced slots therein and the others thereof having axially-extending jaws thereon, said power shaft being selectively engageable with each of said driven shafts by means of a clutch member; said clutch member comprising a substantially cylindrical member slidable and rotatable with the power shaft and having on the periphery thereof an annular groove of a width substantially greater than the diameter of the balls with spaced radially-disposed pockets leading therefrom and cooperating with said balls to connect and disconnect the power shaft with said outer driven shaft and having at the end thereof axially-extending jaws for cooperation with the jaws on the inner driven shafts whereby, when the balls are disposed in said pockets, the power shaft and said outer driven shaft are connected and whereby, when the balls run free in one side of said groove, the power shaft is disconnected from all driven shafts and, when the ball runs free in the other side of the groove, the power shaft is connected with one of said inner driven shafts.

7. As an article of manufacture, a clutch shifter comprising a substantially cylindrical member having on the periphery thereof ball receiving and retaining channel-way means comprising an annular groove having extending axially therefrom radially-spaced pockets of the same depth as the groove.

8. As an article of manufacture, a clutch shifter comprising a substantially cylindrical member having on the periphery thereof ball receiving and retaining channel-way means comprising a plurality of axially-extending, radially-spaced pockets connected at one end thereof by an annular groove, said groove and pockets being disposed intermediate the ends of said member.

9. As an article of manufacture, a clutch shifter comprising a substantially cylindrical member having on the periphery thereof ball receiving and retaining channel-way means comprising a plurality of axially-extending, radially-spaced pockets of the same width, depth and length, interconnected at one end by an annular groove having substantially the same depth and substantially twice the width of said pockets.

RALPH ERVIN SMITH.